April 15, 1958 — E. A. THOMPSON — 2,830,822
CENTRIFUGAL CHUCK

Filed April 9, 1957 — 3 Sheets-Sheet 1

INVENTOR.
EARL A. THOMPSON
BY
ATTORNEYS.

April 15, 1958  E. A. THOMPSON  2,830,822
CENTRIFUGAL CHUCK

Filed April 9, 1957  3 Sheets-Sheet 2

INVENTOR.
EARL A. THOMPSON
BY
ATTORNEYS.

April 15, 1958 E. A. THOMPSON 2,830,822
CENTRIFUGAL CHUCK
Filed April 9, 1957 3 Sheets-Sheet 3
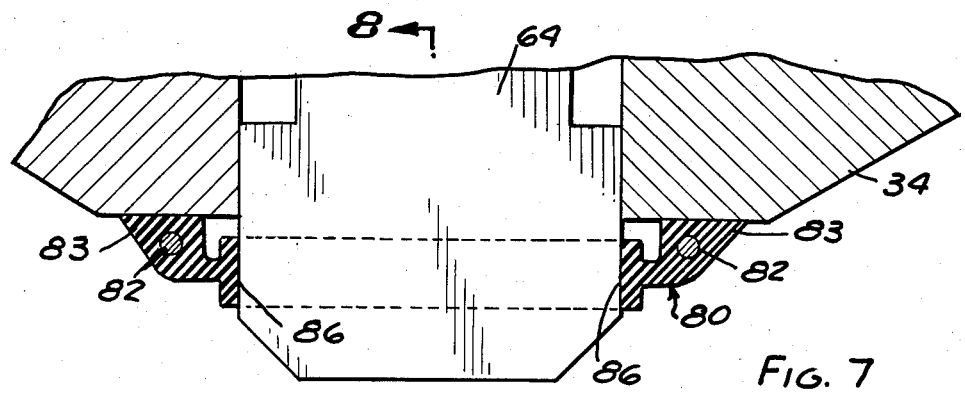
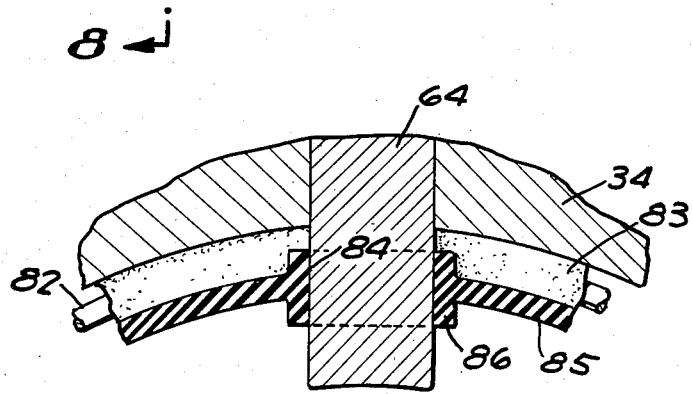
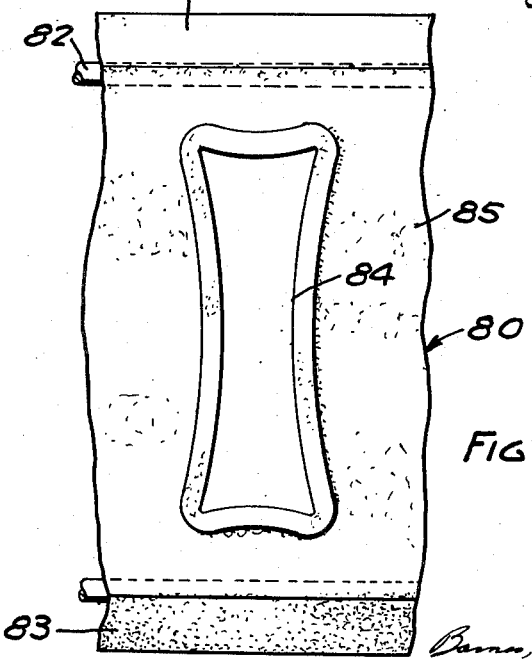
INVENTOR.
EARL A. THOMPSON
BY
ATTORNEYS.

United States Patent Office 2,830,822
Patented Apr. 15, 1958

2,830,822

CENTRIFUGAL CHUCK

Earl A. Thompson, Ferndale, Mich.

Application April 9, 1957, Serial No. 651,658

18 Claims. (Cl. 279—66)

This invention relates to a centrifugal chuck.

It is an object of the invention to provide a centrifugal chuck particularly adapted for high precision work, a chuck that is relatively simple in its construction and very positive in its action.

More specifically, the invention contemplates a chuck wherein the rotor or body portion of the chuck supports a plurality of weighted members which are movable radially outwardly in response to centrifugal force to chord a ring member on which a plurality of jaws are mounted. The chuck jaws are mounted on the ring member between the weighted members so that when the ring member is chorded by the centrifugal action of the weighted members, the jaws are moved radially inwardly to grip around the work piece. The chuck is furthermore designed so that a tubular work piece engaged by the chuck can be worked upon from both ends. In addition, the chuck is designed such that in use, none of the component parts are subjected to abuse with the reception of the jaws; and since these can be formed of hardened tool steel, the chuck is adapted to function very accurately for a very long period of time.

Other objects and advantages of the chuck construction of the present invention will become apparent from the following description in which:

Fig. 7 is a fragmentary view on an enlarged scale of a portion of the arrangement illustrated in Fig. 3.

Fig. 8 is a sectional view along the lines 8—8 in Fig. 7.

Fig. 9 is a fragmentary plan view of the annular seal shown in Figs. 7 and 8.

Figure 1:
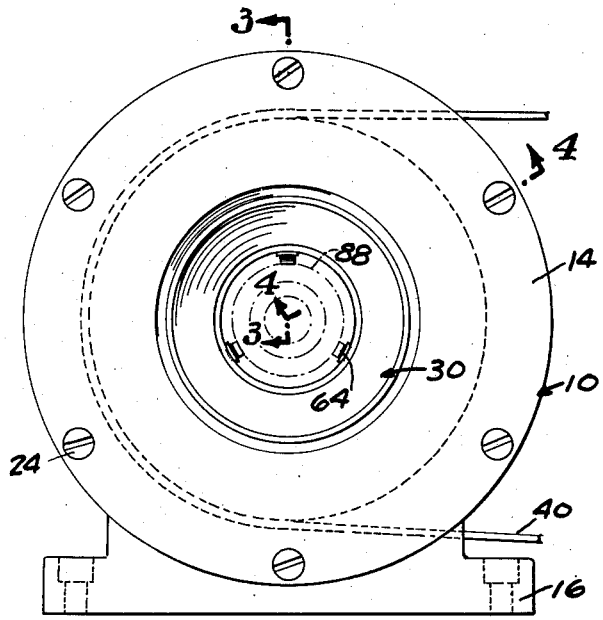
Fig. 1 is a side elevational view of the chuck.
Figure 2:
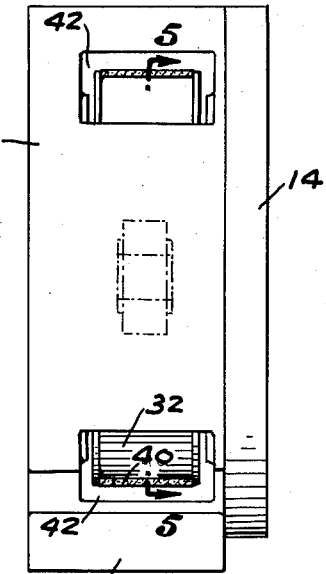
Fig. 2 is an end elevational view of the chuck.

Referring more particularly to the drawings, the chuck includes a housing 10 formed of two members 12 and 14. The member 12 includes a base portion 16 and a body portion having a cylindrical cavity 18 which is open at one end and closed at the other end by an annular wall 20. Wall 20 is formed with a central opening 22. The member 14 comprises a ring arranged to close the open end of cylindrical cavity 18. Ring 14 is mounted on body 12 by a plurality of screws 24. Body 12 and ring 14 are fashioned with annular bearing seats 26 in which ball bearings 28 are arranged. A rotor 30 is supported within housing 10 on bearings 28. Rotor 30 comprises an outer peripheral pulley portion 32 having inner annular ring members or side plates 34 secured to opposite sides thereof by screws 36. The side plates 34 are provided with bearing seats 38 for the inner races of bearings 28. Rotor 30 is adapted to be driven by a belt 40 from a power source, not shown. Body 12 is provided with spaced openings 42 at one side thereof through which belt 40 extends.

Figure 3:
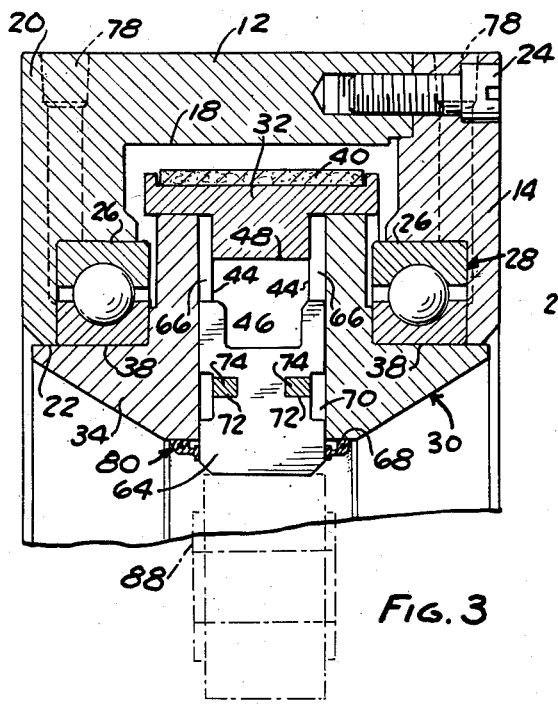
Fig. 3 is a fragmentary sectional view of the chuck through one of the jaws and taken along the lines 3—3 in Fig. 1.

The side plates 34 of rotor 30 are machined with inner side faces 44 which are spaced apart and which cooperate to define an annular, generally cylindrical chamber 46 within rotor 30. The outer periphery of chamber 46 is defined by the inner cylindrical surface 48 of pulley portion 32 (Fig. 3). The inner periphery of chamber 46 is defined by the cylindrical surfaces 50 of side plates 34.

Within chamber 46, there are arranged a plurality of weights 52, preferably three in number. Each weight is formed as a segment of a ring and includes an arcuate body portion 54 having a radially inwardly extending lug 56 at the center of the inner edge thereof. Lugs 56 are fashioned with bearing portions 58 on opposite sides thereof. The arcuate body portions 54 of weights 52 are dimensioned in thickness to have a close fit with the side walls 44 of chamber 46. The radial dimension of weights 52 at lug 56 is slightly less than the radial distance between surfaces 48 and 50 of chamber 46 so that the weights are permitted to move radially a slight amount within chamber 46. Radial movement of weights 52 in chamber 46 is guided by a plurality of keys 60, one for each weight 52 mounted in one of the side plates 34 which engage in radial keyway 62 in the arcuate body portion 54 of each weight 52.

Figure 5:
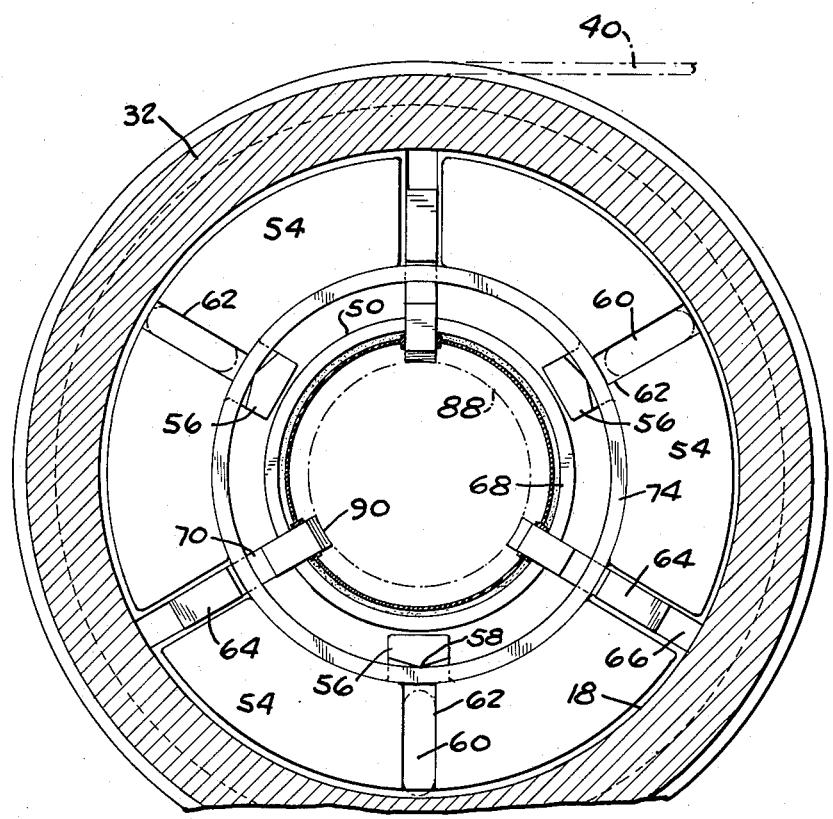
Fig. 5 is a sectional view of the chuck taken along the lines 5—5 in Fig. 2.
Figure 6:
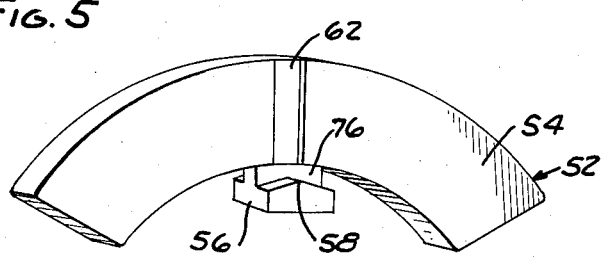
Fig. 6 is a perspective view of one of the weighted members.

The adjacent ends of the arcuate body portions 54 of weights 52 are spaced apart circumferentially as shown in Fig. 5, and in the spaces provided therebetween are arranged three radially extending jaws 64. Jaws 64 are fashioned as hardened tool steel plates which are guided for movement in a radial direction by means of radial slots 66 formed in inner side faces 44 of side plates 34. The inner end of each jaw 64 projects through the inner peripheral surface 68 of rotor 30. The opposite side edges of jaws 64 are formed with notches 70 that are recessed as at 72. A hardened steel ring 74 is press fitted into the recesses 72 at each side of jaws 64. Lugs 56 of weights 52 are fashioned with arcuate slots 76 to accommodate rings 74.

Housing 10 is provided with passageways 78 for directing lubricant to the two bearings 28. Passageways 78 are preferably connected with a mist oiler, not shown. A small quantity of lubricant can be introduced into chamber 46 for oiling the moving parts; that is, the weights 52 and jaws 64 in this chamber. It will be appreciated that these parts move only slightly and therefore need little lubrication.

Figure 4:
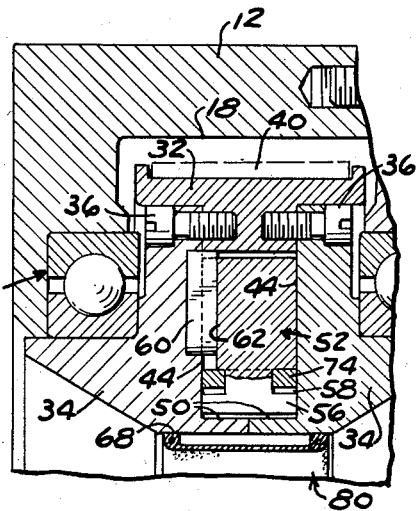
Fig. 4 is a fragmentary sectional view of the chuck through one of the weighted members and taken along the lines 4—4 in Fig. 1.

The oil in the chamber 46 is sealed in and dirt, coolant, etc. is sealed out by means of a unitary sealing ring 80 formed of synthetic rubber or similar material. This takes the form of a doubly shouldered ring, the cross section of which is illustrated in Figs. 3 and 4. Fig. 3 shows the section where a chuck jaw comes through an opening in the ring, and Fig. 4 shows the cross section intermediate the jaws. The seal 80 is shown in detail in Figs. 7, 8 and 9 from which it will be seen that at either side, the seal is provided with triangular shaped sealing lips 83 within which are embedded metallic reenforcement rings 82. The web 85 which forms the major area of the ring is thin and flexible to permit considerable stretching while installing the ring in position. The ring 80 is provided with openings 84 which surround the individual jaws 64 of the chuck. These openings are surrounded with upstanding sealing lips 86 seen in Figs. 7 and 8. The size and shape of the opening 84 is not the same as the size and shape of the jaw 64, but instead is somewhat in the nature of an hourglass profile so that the lips 86 will cling tightly to the jaws 64 along the wide spans of jaw surface extending from corner to corner. This hourglass profile is readily seen in Fig. 9 which illustrates the ring before the chuck jaw is inserted in the opening 84.

In operation, the present chuck, when at rest, permits the rings 74 to assume their normal circular shape, thus holding jaws 64 in their radially outermost position. When, however, the rotor 30 is revolved at normal running speed, the centrifugal weights 52 pull the adjacent portions of the rings 74 outwardly as shown by the arrows A, B and C in Fig. 10. This forces the chuck jaws 64 radially inward to tightly grip a work piece which has been placed in the chuck opening.

Figure 10:
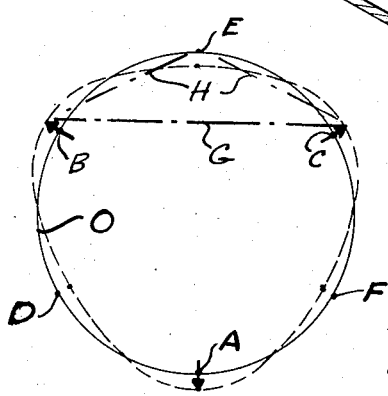
Fig. 10 is a view illustrating in a diagrammatic way the operation of the chuck of the present invention.

This is illustrated in a diagrammatic manner in Fig. 10, wherein the ring 74 is represented by the line O. The bearing portions 58 of weights 52 are designated at points A, B and C and the connection between ring 74 and jaws 64 are indicated at D, E and F. As the chuck rotates, the centrifugal force of weights 52 causes points A, B and C to move radially outwardly, thus tending to straighten the ring between these points. This causes the points D, E and F to move radially inwardly which results in a firm gripping of the work piece by the chuck jaws.

Weights 52 are dimensioned so that the jaws 64 have a maximum radially inward movement of about .010" on the diameter. Thus, if a work piece such as shown at 88 having an outer diameter a few thousandths less than the diameter of the circle defined by the jaws when at rest is inserted in the chuck, the work piece will be firmly gripped when the chuck is rotated at a speed sufficient to cause the weights 52 to chord rings 74 and thus shift jaws 64 radially inwardly.

In order that the chuck will operate with a very high degree of accuracy, the weights 52 are very accurately machined so that the centrifugal force of each will be substantially the same. In addition, the inner end surfaces 90 of jaws 64 are preferably ground while the rotor 30 is rotating so that the circle defined by these surfaces is accurately dimensioned and concentric with axis of rotation of the chuck.

It will be noted from Figs. 5 and 10 that there is a decided stiffening action upon the ring O as soon as the jaws 64 become engaged with the work. Prior to such engagement, the ring acts as an unsupported beam between adjacent weights and is analogous to the cord G in Fig. 10, extending between points B and C. When the jaws are engaged, however, the ring O is then supported at six points around its circumference and is stiffened by reason of the shortening of its free sections into six parts analogous to the cords H in Fig. 10.

Thus, it will be seen that I have provided a centrifugal chuck that is admirably suited for gripping work pieces for operation requiring high precision. Since the jaws 64 of the chuck engage only the outer cylindrical surface of the work piece while permitting access to each end of the work piece, it is apparent that both ends of the work piece may be operated on simultaneously while the work piece is chucked. Furthermore, it will be noted that the only parts of the chuck that are subjected to wear and abuse are the jaws 64. However, the jaws can be formed of hardened tool steel; and thus, the chuck is designed to operate satisfactorily without any appreciable wear over a relatively long period of time.

It will be appreciated that although the construction herein described is termed a chuck, it also operates as a clutch. When rotor 30 is rotated a driving connection is established between rotor 30 and the work piece. Thus the term chuck is used herein and in the appended claims in a broad sense to include a clutch as well.

I claim:

1. A centrifugal chuck comprising a support, a rotor journalled on said support, drive means for said rotor, a plurality of weights arranged circumferentially around said rotor and movable radially outwardly thereon in response to centrifugal force, a plurality of radially movable jaws on said rotor and a ring engaging said jaws at circumferentially spaced points, said weights engaging said ring at circumferentially spaced points intermediate the points of engagement of said ring and jaws such that when said weights move radially outwardly in response to centrifugal force, said ring is chorded, thus causing said jaws to move radially inwardly on said rotor.

2. A centrifugal chuck comprising a support, a rotor journalled on said support, drive means for said rotor, a plurality of weights arranged circumferentially around said rotor and movable radially outwardly in response to centrifugal force, a radially movable jaw on said support positioned between the adjacent weights in each pair and a ring member on said rotor, said ring member being operatively associated with said weights and jaws such that when the weights move radially outwardly in response to centrifugal force, said ring is chorded and said jaws are thereby moved radially inwardly.

3. A centrifugal chuck comprising a rotor, means for rotating said rotor, a plurality of circumferentially spaced, radially shiftable jaws on said rotor, said jaws being interconnected by a ring concentric with the axis of the rotor and means on said rotor responsive to centrifugal force to chord said ring inwardly at the points of connection between said jaws and ring when the rotor is rotated.

4. A centrifugal chuck as called for in claim 3 including a housing in which said rotor is journalled, said housing having a central opening therethrough into which said jaws project radially and means opposite from said through opening for driving said rotor whereby a cylindrical work piece engaged by said jaws is accessible for working at opposite ends thereof.

5. A centrifugal chuck as called for in claim 4 wherein said drive means have a driving connection with a peripheral portion of said rotor.

6. A centrifugal chuck as called for in claim 3 wherein said last mentioned means comprises a plurality of weights arranged circumferentially around said rotor, said weights being movable radially outwardly on said rotor in response to centrifugal force and having radially outwardly directed bearing portions engageable with said ring between the connections of said jaw and ring.

7. A centrifugal chuck as called for in claim 6 including a radial guideway on said rotor for guiding each of said weights radially, said guideways providing a driving connection between said rotor and weights.

8. A centrifugal chuck as called for in claim 6 wherein said weights and jaws are equal in number and are arranged regularly in alternate relation around said rotor.

9. A centrifugal chuck as called for in claim 6 wherein said weights comprise arcuate segments, the ends of circumferentially adjacent segments being spaced apart circumferentially, said jaws being mounted on said rotor one in each of the spaces between the ends of said circumferentially adjacent weights.

10. A centrifugal chuck as called for in claim 9 including means on said rotor forming a radial guideway for each jaw.

11. A centrifugal chuck comprising a support, a rotor journalled on said support, means for rotating said rotor, a plurality of radially extending jaws on said rotor spaced equally apart circumferentially, said jaws each having at the opposite axial end faces thereof a shoulder facing radially outwardly, a ring at each of said end faces engaging said shoulders, a plurality of weights equal in number to said jaws spaced circumferentially around said rotor and mounted thereon for radially outward movement in response to centrifugal force, each weight having a radially outwardly directed bearing portion adapted to engage the inner periphery of said rings at points spaced equally between the points of engagement of said rings with said shoulders on the jaws whereby when said weights move radially outwardly in response to centrifugal action, the portions of said rings between said bearing points are chorded inwardly whereby all of the jaws move radially inwardly to the same extent.

12. A centrifugal chuck comprising a housing, a rotor journalled in said housing, said rotor having spaced apart side walls and generally cylindrical inner and outer peripheral walls, said walls defining an annuar chamber in said rotor, a plurality of weights arranged circumferentially within said chamber, said weights being rotatable with said rotor and guided for radial movement in said chamber, a plurality of radially extending circumferentially spaced jaws in said chamber projecting through said inner peripheral wall of the rotor, said jaws being mounted in said chamber for radial movement and means interconnecting said jaws and weights for causing radial inward movement of the jaws in response to radial outward movement of the weights.

13. A centrifugal chuck as called for in claim 12 wherein said last mentioned means comprises a flexible but relatively inextensible ring member in said chamber, said weights and said jaws engaging the inner periphery of said ring in alternate relation whereby as the weights move radially outwardly in response to centrifugal force, the ring is chorded and said jaws are moved radially inwardly.

14. A centrifugal chuck as called for in claim 13 wherein each weight comprises an arcuate segment extending circumferentially within said chamber adjacent the inner surface of said outer peripheral wall, the ends of adjacent segments being spaced apart and said jaws being disposed radially in the spaces between said ends of adjacent segments.

15. A centrifugal chuck as called for in claim 13 wherein said inner peripheral wall is provided with circumferentially spaced openings therein through which said jaws project and an annular seal fitted within the radially inner surface of said inner peripheral wall and having openings therein through which said jaws project, the edges of the openings in said seal engaging said jaws in sealing relation to prevent the egress of lubricant from within said chamber.

16. A centrifugal chuck as called for in claim 15 wherein the edges of the openings in said annular seal through which said jaws project define an opening of smaller size than the cross sectional area of the jaws prior to the insertion of the jaws therethrough.

17. A centrifugal chuck comprising a housing, a rotor journalled in said housing, said rotor having spaced apart side walls and generally cylindrical inner and outer peripheral walls, said walls defining an annular chamber in said rotor, a purality of weights arranged circumferentially within said chamber, said weights being rotatable with said rotor and guided for radial movement in said chamber, a plurality of radially extending, circumferentially spaced jaws in said chamber projecting through said inner peripheral wall of the rotor, said jaws being mounted in said chamber for radial movement, said jaws having a pair of recesses in the opposite axially end faces thereof, a ring member seated in each set of said recesses, said weights having localized bearing portions engageable with the inner peripheral surface of said rings whereby when said rotor is rotated, said weights move radially outwardly in response to centrifugal force thereby chording said rings and causing said jaws to move radially inwardly to grip a work piece disposed at the inner ends thereof.

18. A centrifugal chuck as called for in claim 17 wherein the sidewalls of said chamber are provided with radial guideways engaging portions of said weights and said jaws for guiding the radial movement thereof.

No references cited.